US012789309B2

(12) United States Patent
Fava

(10) Patent No.: US 12,789,309 B2
(45) Date of Patent: Nov. 10, 2026

(54) AUTOMATIC MACHINING SYSTEM

(71) Applicant: Starmatik Srl Uninominale, Spresiano (IT)

(72) Inventor: Stefano Fava, Spresiano (IT)

(*) Notice: Subject to any disclaimer, the term of this patent is extended or adjusted under 35 U.S.C. 154(b) by 585 days.

(21) Appl. No.: 18/698,310

(22) PCT Filed: Mar. 4, 2022

(86) PCT No.: PCT/IB2022/051920
§ 371 (c)(1),
(2) Date: Apr. 3, 2024

(87) PCT Pub. No.: WO2022/189919
PCT Pub. Date: Sep. 15, 2022

(65) Prior Publication Data
US 2025/0010416 A1 Jan. 9, 2025

(30) Foreign Application Priority Data
Mar. 11, 2021 (IT) ........................ 102021000005675

(51) Int. Cl.
*B23Q 7/14* (2006.01)
*B21D 43/00* (2006.01)

(52) U.S. Cl.
CPC ......... *B23Q 7/1431* (2013.01); *B21D 43/003* (2013.01)

(58) Field of Classification Search
CPC .... B23Q 7/1431; B21D 43/003; B21D 22/06; B21D 22/26; B21D 22/18; B21D 53/88; B25J 11/005; B25J 19/06
USPC ........................................................ 414/795.8
See application file for complete search history.

(56) References Cited

U.S. PATENT DOCUMENTS

| | | | | |
|---|---|---|---|---|
| 5,329,732 | A * | 7/1994 | Karlsrud | H10P 72/78 451/334 |
| 6,113,465 | A * | 9/2000 | Kim | B24B 37/005 257/E21.244 |
| 6,547,650 | B2 * | 4/2003 | Inaba | B24B 37/345 451/41 |
| 6,892,472 | B2 * | 5/2005 | Quarantello | H10P 72/0408 34/317 |
| 12,198,944 | B2 * | 1/2025 | Brown | B24B 41/06 |
| 2001/0031197 | A1 | 10/2001 | Jager | |
| 2021/0346937 | A1 * | 11/2021 | Fava | B21D 43/023 |

FOREIGN PATENT DOCUMENTS

| | | | |
|---|---|---|---|
| WO | 2020079477 | 4/2020 | |
| WO | WO-2020079477 A1 * | 4/2020 | B21D 43/003 |

* cited by examiner

*Primary Examiner* — Sameh Tawfik
(74) *Attorney, Agent, or Firm* — Themis Law

(57) ABSTRACT

An automatic machining system includes a loading station for loading pieces to be machined on one or more loading pallets, a base or platform on which the following are installed in predefined positions: the loading station, a loader, a robot configured to handle the pieces, and at least one unloading station where the machined pieces are unloaded. The automatic machining system also includes protection sides installed along the perimeter of the base or platform, with at least one movable partition for the insertion/extraction of the loading pallets.

13 Claims, 3 Drawing Sheets

AUTOMATIC MACHINING SYSTEM

FIELD OF THE INVENTION

The present invention relates to automatic machining systems and in particular concerns a new, improved, compact and pre-assembled automatic machining system.

BACKGROUND OF THE INVENTION

Automatic machining systems with mechanical presses that perform various types of operations on workpieces, such as bending, punching, etc. are already known in the prior art.

Typically, such systems comprise a plurality of devices that work in synchrony, including: a workpiece loading system, a robot that moves each workpiece, at least one mechanical press that performs the machining on the workpiece.

Typically, the systems of the prior art include one or more tool magazines, from which the robot picks the machine tools to be connected to the press, depending on the machining to be performed, and the gripping tools with which the robot grips and constrains the workpiece, depending on the shape and size of the workpiece itself.

The systems of the prior art are also equipped with means and devices to ensure the proper positioning of the workpiece to be picked up by the robot, devices to control the workpiece, for example to measure the thickness in the case of workpieces made up of metal sheets, and control devices in general.

In addition, the systems of the prior art must include adequate safety walls, in order to prevent unauthorized access in the entire processing area, as well as limiting noise pollution for example. Normally these safety walls are arranged in such a way as to completely surround the loading area, the robot movement area, and the areas occupied by the moving parts of the press.

These safety walls must obviously include openings through which pallets can be introduced for loading the workpieces and through which the machined workpieces leave the processing area to be forwarded to subsequent processes.

When the pallets are placed within the space defined by the safety walls, the manual or automatic partitions close said openings preventing access by unauthorized persons. In contrast, when the pallets are extracted to be re-loaded, said openings must remain open, and thus access to the area is not prevented.

Currently, the procedure for installing systems of this type is very complex, and must be done up to standard in order to guarantee the required machining precision.

In particular, the position in which the workpiece to be loaded is placed must be accurately defined with respect to the position of the robot, as must the position of the press and tool magazines. In fact, even errors of a few millimeters may seriously compromise the precision of the machining. Similarly, the dimensions of the devices that make up the system must also be uniquely and accurately defined, and the horizontality of the support surface must be guaranteed, as well as the parallelism and orthogonality in the positioning of the devices.

Therefore, currently, the manufacturing of individual devices is carried out in the plant that makes the system, while the assembly of the system takes place in the plant where the system will actually be used, and once assembled, it can no longer be moved without complex disassembly, handling, re-installation and calibration operations.

In addition, before installation, it is necessary to verify the horizontality of the support surface and the proper positioning of each of the devices that will be installed.

SUMMARY OF THE INVENTION

A new, improved, compact and pre-assembled automatic machining system is the object of this patent.

The main object of the present invention is to provide for faster, simpler and safer installation procedures than the systems of the prior art.

Another object of the present invention is to facilitate the calibration operations of the entire set of devices.

One advantage of the present invention is that it is modular and therefore able to include presses of various types and sizes, using special connecting and lifting elements.

Another object of this invention is to prevent unauthorized access even during the exchange of the workpiece loading pallets, enabling continuous operation without interruptions of operations during loading and unloading of materials being machined.

Another object of the present invention is to be transportable and pre-assembled.

Another object of this invention is to speed up the procedures for loading the workpieces to be machined and unloading the machined workpieces, which can be handled by standard utility vehicles like forklifts, or by automatic guided or remotely controlled vehicles.

These and other objectives, direct and complementary, are achieved by the new improved, compact and pre-assembled automatic machining system.

The new modular system comprises:

At least one loading station, intended to house one, two or more pallets with the workpieces to be machined;

a loader, suited to take at least one workpiece at a time from said loading area and translate it to the centering device;

at least one centering device, suited to receive said workpiece to be machined and place it in the pre-established position in order to be picked up by a robot;

at least one tool magazine for a machine tool;

at least one magazine for gripping tools for at least one robot suited to handle the workpieces to be machined;

at least one robot, with at least one mechanical arm suited to: pick up and mount the gripping tools; pick up and mount the tools for the machine tool; pick-up said workpieces from said centering device; move said workpieces during their processing in said machine tool; place the processed workpieces on at least one unloading device or station;

a base or platform on which said at least one loading station, said loader, said centering device, said tool magazines, said robot and said at least one unloading station, are assembled in pre-established positions;

Said base or platform comprises adjustable feet for levelling it in such a manner that the horizontality of the entire system can be achieved just by adjusting said feet, with no need for further interventions and adjustments of other parts of the system.

The system also comprises at least one press, suited to perform one or more operations on said workpiece, and at least one base or raised portion on which said at least one press is mounted, and wherein said base or platform comprises coupling means of said raised portion, said coupling means being preferably placed along or near an edge of said platform so that the press is secured side by side with said platform and, therefore, in the proper position with respect to said robot.

The new system also includes safety walls, mounted substantially along the perimeter of said base or platform, in such a manner as to house all the working parts of the assembly. The system also includes additional safety walls, mounted substantially around said press, and joined to said safety walls mounted on said platform.

At least one of said safety walls can be moved and opened, determining at least one opening to enable the insertion of one or more loading pallets in said loading station.

Said loading station therefore comprises at least one standby area for said one or more loading pallets and said at least one movable safety partition, suited to be selectively positioned to close said opening once one of said forklifts has inserted or extracted a pallet, so as to prevent unauthorized access to the area where the operations are carried out, without preventing the normal pallet insertion/extraction operations.

The system also comprises one or more loading pallets removably inserted in said standby areas.

Said perimeter safety walls also comprise one or more movable and openable partitions that determine at least one opening for access to said unloading area, where additional pallets on which the machined workpieces will be loaded on may optionally be present.

The loading and unloading operations of the system are thus optimized since it is possible to load the pallets by means of common industrial trucks such as forklifts or the like, which can also be used to extract empty pallets or pallets with machined workpieces. This solution makes the installation of a conveyor belt inside the system unnecessary.

The new system can also be combined with a floor guide system or a remote-controlled automatic guide system for handling the loading pallets with the workpieces to be machined or the machined workpieces.

The new system is thus pre-assembled in the production plant, where all the devices are positioned on said platform and fixed precisely in the proper relative position and at the right height with respect to the platform plane.

The coupling means of said raised portion of the press are also set, where said coupling means are suitably positioned on the platform so that, once the machine is in the destination plant, the press must simply be installed with the relative raised portion, thus guaranteeing the exact position of the press itself with respect to the other components of the system.

Said platform also includes suitable anchoring points for lifting equipment, so that said system, without the press and the raised portion, can be lifted and transported, for example loaded into a container or suitable means of transport and then unloaded and placed at the destination plant.

By adjusting the feet of the platform, it is possible to accurately adjust the horizontality of the system, once the system is positioned on the final support surface, and finally constrained to the ground using appropriate anchoring means.

Finally, the system comprises at least one command and control station suited to program/control the operation of all moving parts. The command and control station also includes a suitable display and/or a control panel for the operator, for example installed outside said safety walls or even in a remote location.

BRIEF DESCRIPTION OF THE DRAWINGS

The characteristics of the present invention will be better clarified by the following description with reference to the drawings, attached by way of a non-limiting example.

FIG. 1 shows a plan view of a possible embodiment of the new system (1), while

DETAILED DESCRIPTION OF EMBODIMENTS OF THE INVENTION

Figure 1:
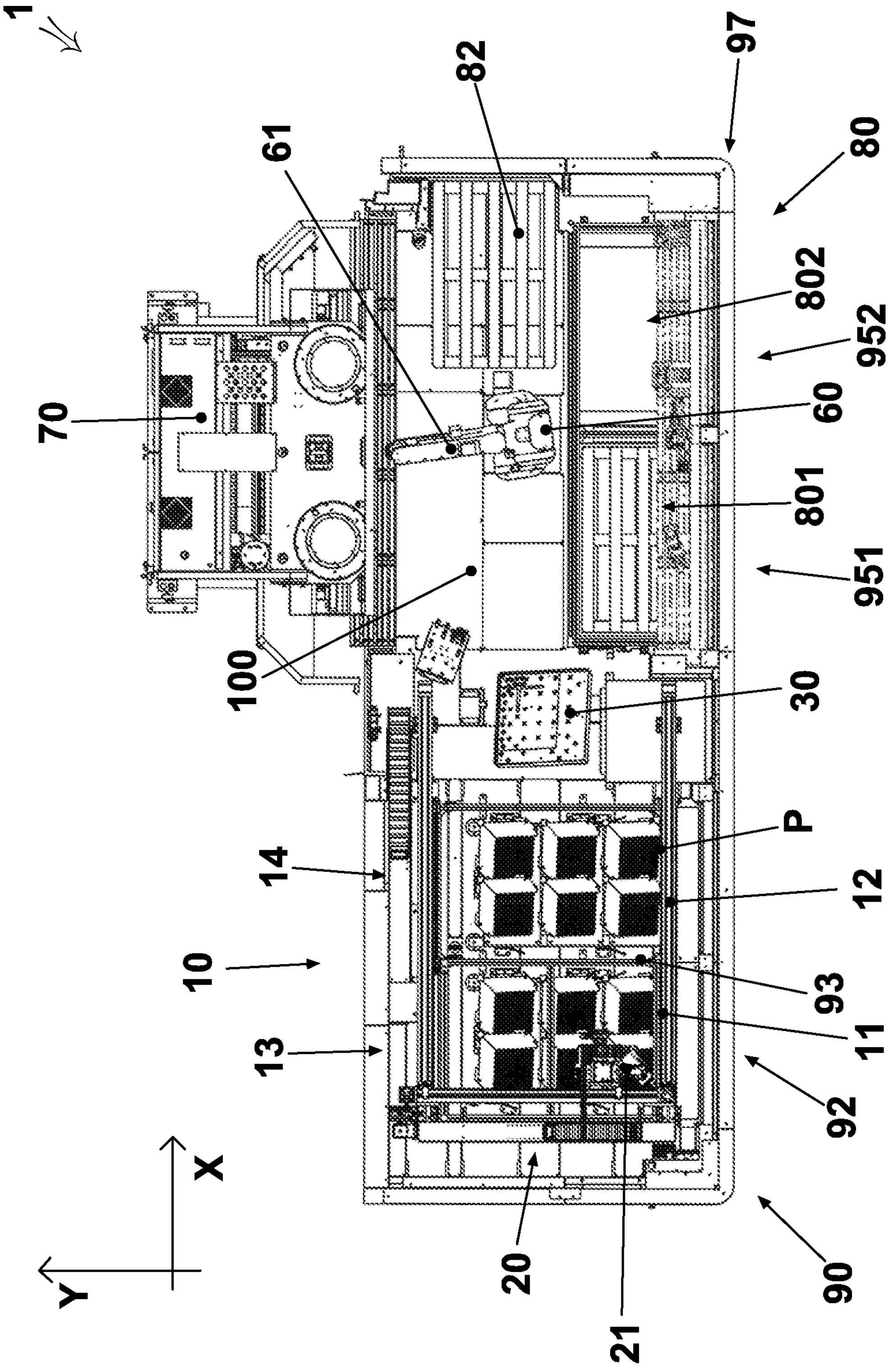
Figure 2:
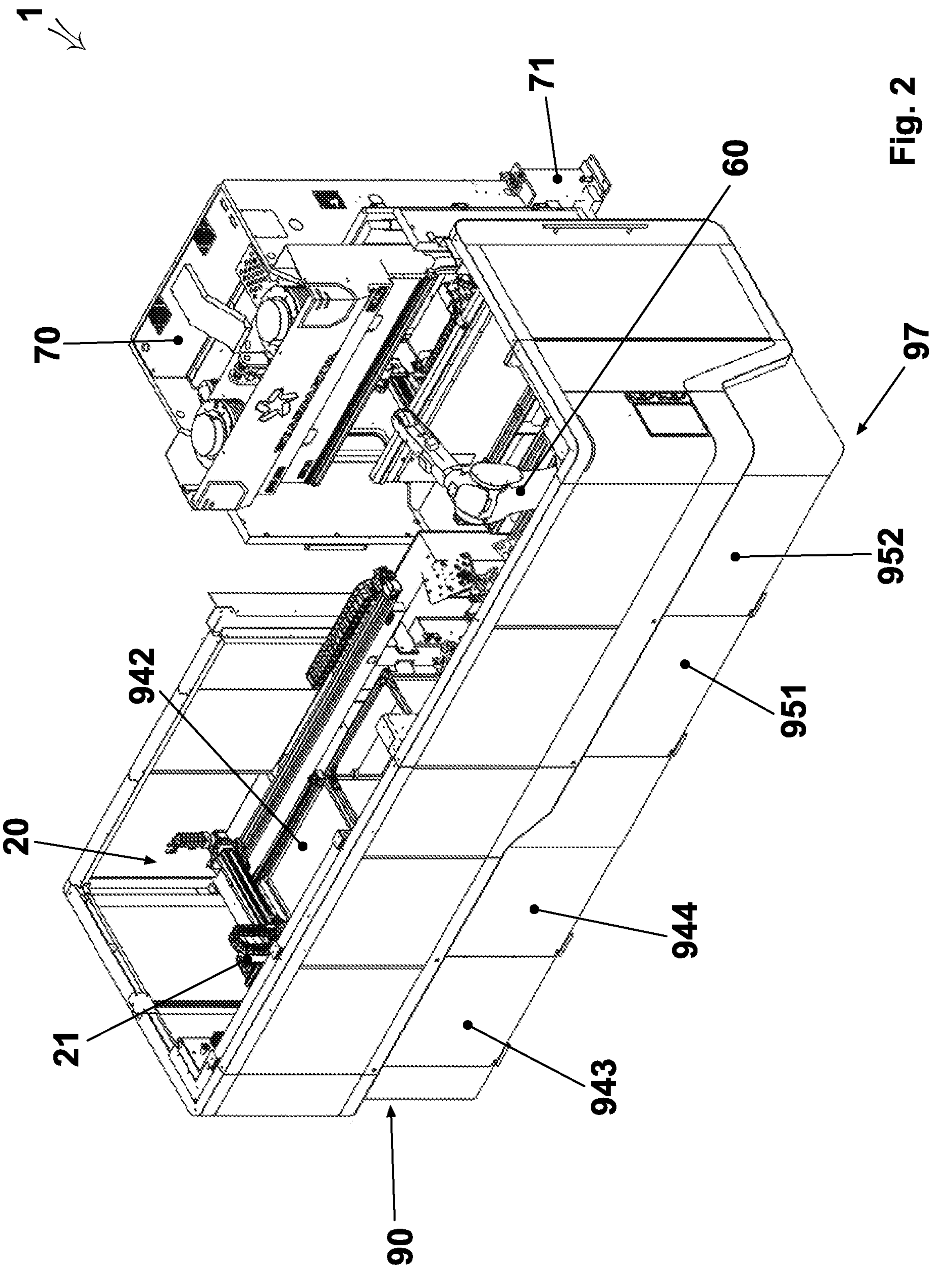
FIG. 2 shows a three-dimensional view.
Figure 3:
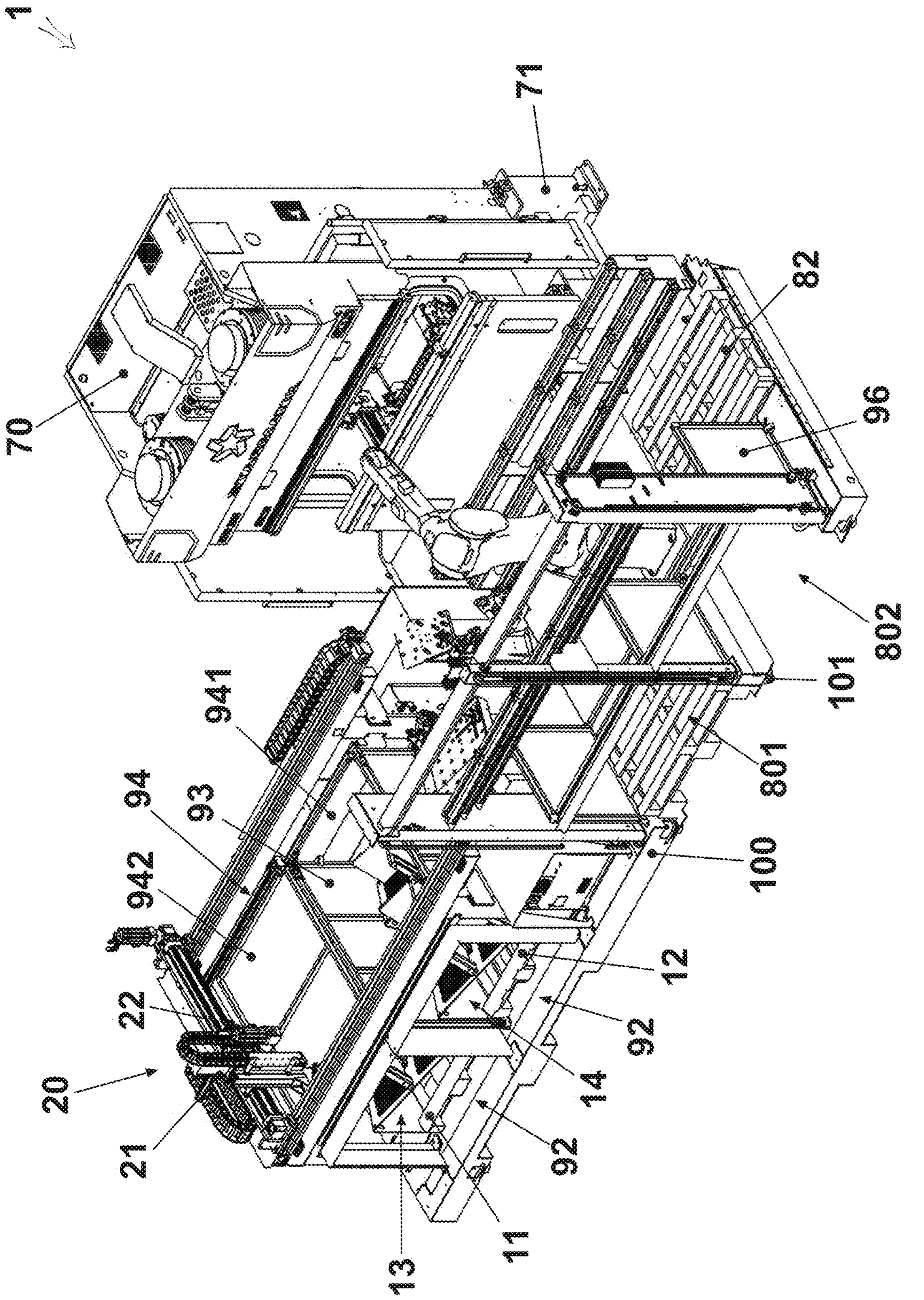
FIG. 3 shows the system of FIG. 2 without safety walls (90).

The new compact and pre-assembled system (1) for the automatic machining of workpieces comprises a base or platform (100) in turn equipped with adjustable feet (101), for example comprising plates suited to be constrained to the ground by anchoring means.

The platform (100) also comprises suitably distributed anchoring points for lifting equipment.

On said platform (100) all the stations that are part of the system are already installed, and in particular, for example, a loading station (10), intended to house one or more loading pallets (11, 12) with the workpieces (P) to be machined.

In the embodiment in the figures, there are two of said pallets (11, 12) and they are each positioned in a standby area (13, 14) of said loading station (10).

A loader (20) suited to take at least one workpiece (P) at a time from said loading area (10) is also installed on said platform (100).

Said loader (20) is preferably able to be translated according to Cartesian axes, comprising a carriage (21) that translates in two horizontal and orthogonal directions (X, Y), and a gripping device (22) suited to move vertically with respect to said carriage (21). Said carriage (21) moves above said pallets (11, 12) positioned in said loading station (10) and said gripping device selects and picks up the workpiece (P) to be machined, which is then transported outside said loading station (10) to a centering device (30).

Also installed on said platform (100), is said at least one centering device (30) suited to receive said workpiece (P) and to place it in its pick-up position for a robot (60).

Said centering device (30) comprises, for example, a tilting plane on which a reference point or zero point is pre-established. When a workpiece (P) is positioned on said plane, the latter is brought to an inclined picking position so that the workpiece (P) is in the proper position with respect to said zero point.

At least one tool magazine for the machine tool (70) and at least one gripping tool magazine for at least one robot (60) suited to handle the workpieces to be machined are also installed on said platform (100).

Said at least one robot (60) is also installed on said platform (100), with at least one mechanical arm (61) suited to: pick up and mount the gripping tools; pick up and mount the tools for the machine tool; pick-up said workpieces from said centering device; move said workpieces during their processing in said machine tool; place the finished workpieces on at least one unloading device or station (80).

The system (1) also comprises at least one machine tool, and in particular at least one press (70), suited to perform one or more operations, such as bending and/or drilling and/or punching in general.

Said press (70) has operating parts that require tools selectable from said tool magazine (40).

Said press (70) is in turn mounted on a base or raised portion (71) comprising coupling means to secure it properly to said platform (100) in an appropriate position, such that said press (70) is positioned next to said platform (100) in a precise and pre-established position with respect to said robot (60).

The new system (1) also comprises at least one unloading station (80), where said robot (60) places the machined workpieces (P).

An additional unloading station (82) may also be positioned on said platform (100) and therefore inside said system (1). In this case, access to said further unloading station (82) requires stopping the processing cycle.

The new system (1) also comprises safety walls (90) mounted substantially along the perimeter of said platform (100), which define a space in which all the working parts installed on said platform (100) are contained.

The system (1) conveniently also comprises additional safety walls, mounted substantially around said press (70), and joined to said safety walls (90) mounted on said platform (100).

Said safety walls (90) mounted on said platform (100) comprise at least one movable partition (943, 944) that determines at least one opening (92) for accessing said loading station (10), to enable the insertion/removal of said loading pallets (11, 12) in the respective standby areas (13, 14).

In the preferred embodiment, each area (13, 14) has its own access opening, closable with a movable partition (943, 944).

Said standby areas (13, 14) of said pallets (11, 12) are separated from each other by at least one fixed partition (93).

When the pallets (11, 12) are properly positioned in the relative standby areas (13, 14), the movable partitions (943, 944) can be closed to prevent access by people within the space delimited by said safety walls (90).

Each standby area (13, 14) is also preferably delimited on all sides.

The system (1) preferably operates, as noted, with at least two standby areas (13, 14) side by side in said loading station (10), where said Cartesian axis loader (20) operates, and which in turn picks up the workpieces (P) from above.

Once one of the two loading pallets (11, 12) located in a standby area (13, 14) is empty, processing can continue by picking up the workpieces to be processed from the second pallet of the other standby area (13, 14), while extracting and inserting a new first pallet with workpieces to process.

In one possible embodiment, said safety walls (90) comprise a single movable partition suited to be selectively positioned in one of said standby areas (13, 14), for example at the position of the pallet (11, 12) which has been removed for loading operations.

Said movable partition (94) may also comprise a vertical portion (941) and a horizontal covering (942) overlying said standby area (13, 14).

Consequently, when a pallet (11, 12) is extracted from the relative standby area (13, 14), said movable partition (94) is placed at the remaining empty standby area, so that access is granted only to the empty standby area, but not within the space where working parts are in motion. Said covering (942) also protects from above.

In the embodiment in the figure, said standby areas (13, 14) are side by side (X) in a direction parallel to a direction of translation of the carriage (21) of said Cartesian loader (20). Therefore, in order to selectively obstruct one of said standby areas (13, 14), said movable partition (94) must substantially translate in that direction. Said translation is usefully performed by said Cartesian loader (20) which, before extracting the empty carriage, translates said movable partition (94) in correspondence with the relative standby area.

The system (1) also comprises, as noted, at least one unloading station (80) within the perimeter of said safety walls (90).

In one possible embodiment, said unloading station (80) is configured with one or preferably at least two unloading areas (801, 802) where the pallets intended to receive the machined workpieces from said robot (60) can be positioned.

Thanks to this solution, the palletization of the machined workpieces takes place directly inside the system (1). This results in an optimization of the processing time, because, once the pallet is completed, it can be simply removed and replaced, without requiring any conveyor belt for the workpieces that in the meantime were processed and completed by the robot (60).

In the embodiment shown in the figures, said unloading areas (801, 802) are side by side and there is at least one movable partition (951, 952) in correspondence with them that selectively enables/disables access to said unloading areas (801, 802).

Said unloading areas (801, 802) may also be delimited on all sides by further fixed or movable partitions (96).

In the preferred embodiment, said standby areas (13, 14) and said unloading areas (801, 802) are located and aligned along the same straight side (97) of the system, so as to optimize the use of space and movements of the utility vehicles handling the pallets. Said straight side (97) is preferably parallel to one of said directions (X) of translation of the carriage (21) of said Cartesian loader (20).

Therefore, with reference to the preceding description and the attached drawings the following claims are made.

The invention claimed is:

1. An automatic machining system comprising:

a loading station configured to house one or more loading pallets carrying pieces to be machined;

a loader configured to pick at least one piece among the pieces at a time from said loading station and to transport the piece to a centering device;

said centering device being configured to receive said piece to be machined and to arrange said piece in a position where said piece can be picked by a robot;

said robot having at least one mechanical arm suited to handle said pieces during machining in a machine tool;

at least one unloading station where the machined pieces are positioned;

a platform on which said at least one loading station, said loader, said centering device, said robot and said at least one unloading station are mounted in predefined positions; and protection sides installed substantially along a perimeter of said platform, said protection defining a space containing all devices and operating members installed on said platform, wherein said protection sides comprise at least one first movable partition which defines an opening configured to allow said at least one loading station to be accessed for an insertion/extraction of said loading pallets, and wherein said loading station comprises two or more standby areas positioned side by side and separated by at least one second partition, each standby area being configured to house at least one of the one or more loading pallets.

2. The automatic machining system according to claim 1, wherein said protection sides comprise at least one third movable partition configured to be selectively positioned to close part of said opening, at a level of a position of one of the one or more pallets which has been removed for loading.

3. The automatic machining system according to claim 2, wherein said loader is configured to move according to Cartesian axes, said loader comprising a carriage that translates in two horizontal directions which are orthogonal to each other, and a gripping device configured to move vertically with respect to said carriage above said loading station.

4. The automatic machining system according to claim 3, wherein said standby areas are positioned side by side in a direction that is parallel to one of the two horizontal directions of the carriage of said loader.

5. The automatic machining system according to claim 3, wherein said at least one third partition translates in a same direction, along a translation caused and controlled by the loader.

6. The automatic machining system according to claim 2, wherein said at least one third partition comprises at least one vertical portion and at least one horizontal covering that is superimposed to at least one of said standby areas.

7. The automatic machining system according to claim 1, wherein said platform comprises adjustable feet.

8. The automatic machining system according to claim 1, further comprising at least one machine tool, said at least one machine tool comprising at least one press configured to carry out one or more machining operations on said piece, and at least one base on which said at least one press is mounted, and wherein said platform comprises coupling means for said at least one base, said coupling means being positioned along or in proximity to an edge of said platform, so that said at least one press is positioned beside said platform.

9. The automatic machining system according to claim 8, wherein said at least one base is integral with said platform.

10. The automatic machining system according to claim 1, wherein said at least one unloading station is configured with one or more unloading areas in which the one more loading pallets may be placed to accommodate the machined pieces, which are positioned in said one or more unloading areas by said robot.

11. The automatic machining system according to claim 10, wherein said one or more unloading areas are positioned side by side and are provided with at least one movable fourth partition which selectively allows/prevents access to said one or more unloading areas.

12. The automatic machining system according to claim 11, wherein said one or more unloading areas are delimited on all sides by additional fixed or movable partitions.

13. The automatic machining system according to claim 10, wherein said two or more standby areas and said one or more unloading areas are arranged and aligned along a same substantially rectilinear side of the automatic machining system.

* * * * *